July 13, 1937.  O. D. GRANDSTAFF  2,086,614
CURRENT CONVERTER
Filed Jan. 15, 1934
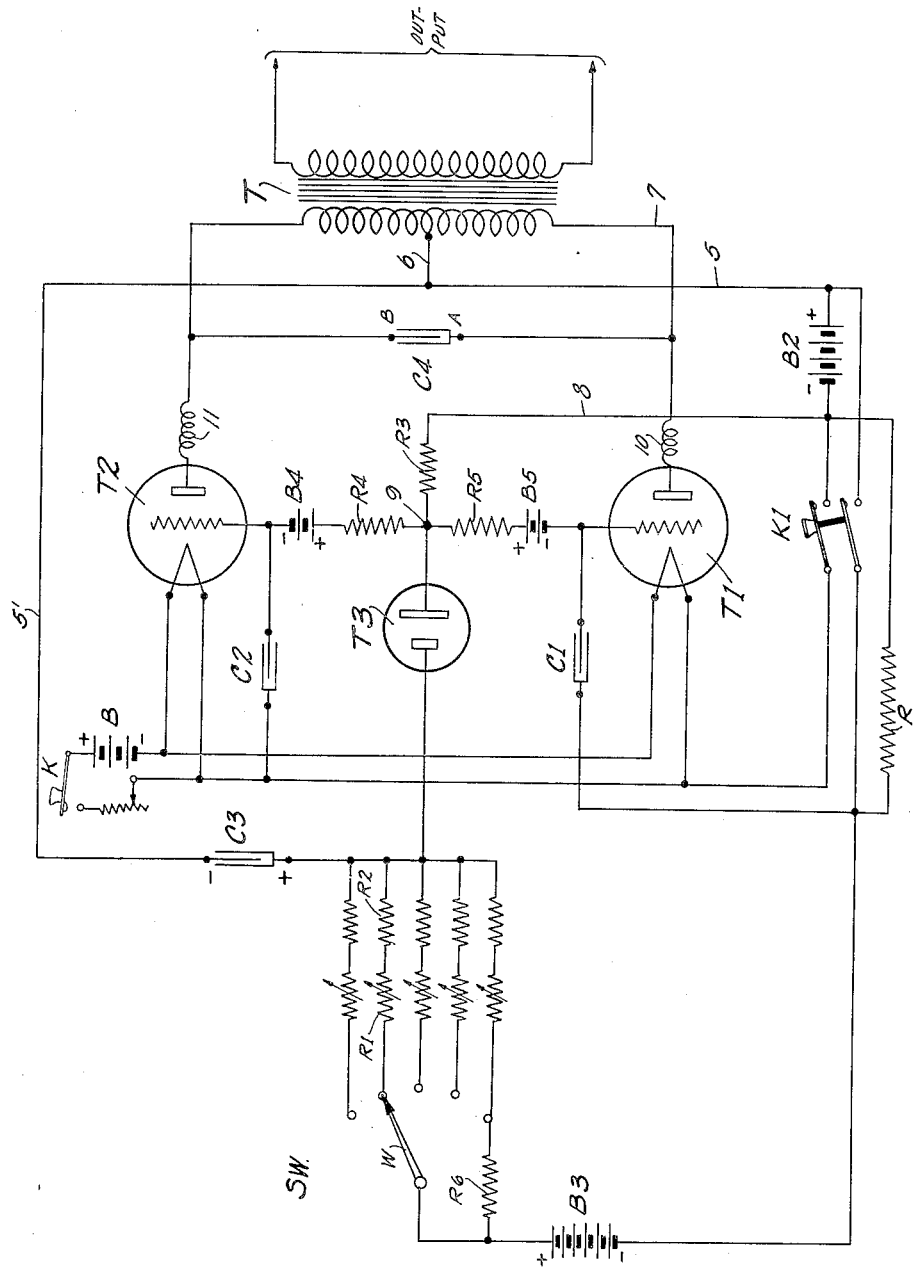
-INVENTOR-
OTHO D. GRANDSTAFF
Wm Walter Owen.
ATTY.

Patented July 13, 1937

2,086,614

UNITED STATES PATENT OFFICE 2,086,614

CURRENT CONVERTER

Otho D. Grandstaff, Chicago, Ill., assignor to Associated Electric Laboratories, Inc., Chicago, Ill., a corporation of Delaware Application January 15, 1934, Serial No. 706,589

6 Claims. (Cl. 175—363)

The present invention relates in general to current converters, but is particularly concerned with the provision of means for converting direct current into multi-frequency alternating currents by use of circuits employing vacuum tubes rather than mechanical pole changers, thereby eliminating moving parts.

Other advantages of the present converter are: its simplicity and compactness, its control of frequency independent of the load, the ease of adjusting the frequency, and the good wave form obtainable.

The invention has been diagrammatically shown in a single sheet of drawing and as shown may be employed to furnish multi-frequency ringing currents required in a telephone system.

The vacuum tubes employed may comprise two General Electric FG27 or FG57 thyratrons and one Radio Corporation of America #247 glow tube. Other tubes of characteristics similar to these mentioned may, of course, also be employed.

The frequency selecting switch SW is merely shown to represent one possible means of selectively connecting any one of a plurality of resistances in circuit with the glow tube in accordance with the frequency to be transmitted. The resistances such as R2 are of a value approximating that required to tune the condenser C3 to a desired frequency, while the associated variable resistance R1 enables the tuning to be made very accurate.

In using the apparatus as a ringing current converter for a telephone system some form of automatically actuated stepping switch, ringing current distributing relays, or a set of manually operable keys would ordinarily be employed instead of a switch such as SW.

In the operation of the converter the key K must first be operated, in order to heat up the filaments of the two thyratron tubes T1 and T2. In the present example, a six-eight volt storage battery is employed for the filament current supply. However, an alternating current source of current may be employed if more convenient.

It will be noted that the grid elements of the tubes T1 and T2 are normally connected to the negative terminals of batteries B5 and B4. It will be noted that condenser C1 is normally charged to the potential of battery B5. The right side of C1 is connected to the negative terminal of B5 and the left side thereof is connected through resistors R, R3, and R5 to the positive side of B5.

After proper heating of the filaments of tubes T1 and T2, which may be maintained permanently energized if desired, the contacts of key K1 are closed to initiate the transmission of current out over the output conductors of transformer T at a frequency determined by the position of wiper W of the frequency selecting switch SW.

The upper contacts of key K1 connect the negative terminal of battery B2 and the positive terminals of batteries B4 and B5 to the cathodes of tubes T1 and T2. The negative potentials of batteries B4 and B5 would normally hold the grids of tubes T1 and T2, respectively, sufficiently negative to prevent either tube from striking if no further circuit change were made. However, the lower contacts of key K1 connect the batteries B5 and B2 in a series circuit across the terminals of condenser C1. The closure of this last circuit causes a charging current to pass through condenser C1 to increase its potential from that of battery B5 to that of B5 plus B2 in series. This charging current of condenser C1 makes available on the grid of tube T1 a positive potential relative to its cathode which is equal to the IR drop in resistors R3 and R5 minus the potential of battery B5. This potential is available as long as condenser C1 is charging, and its charging time is sufficiently long to allow tube T1 to strike.

The first half cycle of the selected frequency now flows from the positive terminal of battery B2 over conductors 5 and 6, through the lower half of the primary winding of transformer T, conductor 7, choke 10, the plate and filament of tube T1 to the negative terminal of battery B2.

The key K1 at its lower contacts, in addition to connecting the positive terminal of battery B2 directly to condenser C1, connects the positive terminal of B2 to the negative terminal of battery B3, and connects the negative side of condenser C3, via conductors 5' and 5 to the negative terminal of battery B3. Positive potential from source B3 now builds up a positive charge on the positive plate of condenser C3 at a rate determined by the resistance of the path including wiper W and the resistances R1 and R2. As soon as the condenser C3 becomes charged to the break down voltage of tube T3 the condenser discharges through this tube, the resistance R3, conductor 8, the battery B2, and through the lower contacts of switch K1 to the negative terminal of battery B3. Branches of the foregoing circuit extend via resistances R4 and R5 and batteries B4 and B5 to the grids of tubes T2 and T1, respectively, thereby momentarily placing a positive bias thereon.

Since the tube T1 is already in operation the positive bias placed on its grid at this time is without effect. The placing of a positive bias on the grid of tube T2, however, causes it to strike, starting the second half cycle of the selected frequency to flow from the positive terminal of battery B2, through conductors 5 and 6, the upper half of the primary winding of the transformer T, the choke 11, the plate and filament of tube T2 and the upper contacts of key K1 to the negative terminal of battery B2. The current flowing over the last traced circuit also causes the B terminal of the condenser C4 to receive a negative charge, thereby attracting a positive charge on the A terminal thereof. The current flowing into the B side of this condenser effects the reduction of the plate potential of tube T1 to or below its cathode potential. This results in the stopping of the current flow through tube T1 for sufficient time for T1 to de-ionize.

When the tube T3 struck, the condenser C3 was quickly discharged, reducing the voltage across the elements of T3 sufficiently to cause it to become extinguished. The voltage on condenser C3 again builds up to the striking voltage of tube T3. When T3 strikes, the tube T1 will strike for the same reasons as did T2 previously. The current flow over the circuit including the plate element of tube T1 and the conductor 7 now causes the A terminal of condenser C4 to receive a negative charge thereby attracting a positive charge on the B terminal thereof. This affects the tube T2 in the same manner as a like condition affected tube T1 and tube T2, accordingly, ceases operation until the next half cycle. This cycle of operations will continue as long as the key K1 remains in its operated position.

Obviously, the various frequencies are obtained by use of fixed and variable resistances, such as R2 and R1 to adjust the speed at which the voltage will be built up in condenser C3.

The resistance R6 is provided as a precaution against the possibility of the blowing of a fuse in the circuit of battery B2 should the wiper W be moved off one contact before engaging another. Under such a circumstance, without the resistance R6, a circuit such as traced via the upper or lower halves of the transformer winding would be closed for a long period compared to the period of one half cycle of any frequency, and owing to the low resistance of such circuit sufficient current would flow to blow the fuse. With the resistance R6, however, should the wiper W at any time move off one contact without engaging another the frequency will merely be changed during such time.

The chokes 10 and 11 are employed to prevent sudden current changes in tubes T1 and T2, respectively, in order to eliminate radio interference.

Having described the invention, what is considered to be new and is desired to be protected by Letters Patent will be set forth in the following claims:

What is claimed is:

1. In an alternating current generator, a pair of three-element thermionic relays, means for energizing the filaments of said relays, means normally maintaining a negative bias on the grids of said relays, means for momentarily placing a positive potential on the grid of one of said tubes to set it into operation, a source of current, a transformer; a circuit including said source, a portion of one winding of said transformer, and a path through one of said relays, while such relay is in operation; a second circuit including said source, another portion of the mentioned winding of said transformer, and a path through the other of said relays while it is in operation; means set into action simultaneously with the application of positive potential on the grid of the first tube of the pair to later apply positive potential to the grids of both tubes to effect the striking of the tube not in operation, and means symmetrically associated with said circuits made effective by current flow through them for causing the operation of one tube to cease upon the operation of the other, to effect the production of alternating current in the output winding of said transformer.

2. In an alternating current converter, a two-element vacuum tube, a pair of three-element vacuum tubes having their grid elements symmetrically connected to one element of said two element tube, a source of current having one of its terminals connected to the filaments of said tubes, means for energizing the filaments of said pair of tubes, a transformer having an intermediate point of its primary winding connected to the other terminal of said current source and having its ends connected to the plate elements of said pair of tubes, a condenser included in a circuit path also including the plates of said pair of tubes, means for causing one of said pair of tubes to operate and thereby transmit current from said source through one portion of the primary winding of said transformer, tuned means including said two element vacuum tube for then causing the inactive tube of said pair to flash and transmit current from said source through the other portion of the primary winding of said transformer, means effective consequent to the operation of said other tube to cause the operation of the first operated tube to cease, said tuned means and the last specified means thereafter cooperating to cause the alternate operation of said pair of tubes and the resulting alternate circuit closures through said transformer to produce alternating current at the terminals of the secondary winding of said transformer.

3. In a multi-frequency converter, a source of current, a glow tube, means for causing current from said source to flow through said tube periodically at any of a plurality of selectable frequencies, a second source of current, a condenser, and circuits and apparatus including a pair of vacuum tubes alternately actuated under control of the current flow through said glow tube and the influence of said condenser to convert current obtained from said second source into alternating current of one of any of a selected number of frequencies.

4. In a multi-frequency converter, a source of current, a glow tube, means for causing current from said source to flow through said tube periodically at any of a plurality of selectable frequencies, a second source of current, a condenser, a transformer, output circuits each including the primary winding of said transformer and said second current source, a pair of vacuum tubes, means for causing one of said tubes to flash and close one of said output circuits, and means then effective to place said tubes alternately under control of said condenser and current flow through said glow tube to close said output circuits alternately at a selected frequency.

5. In an alternating current generator, a glow tube, a condenser, a source of current, a plurality of different resistance paths selectively included in circuits including said glow tube and condenser to cause said condenser to be charged and then discharged through said glow tube at a frequency in accordance with the path selected, a source of direct current, vacuum tubes, and means controlled by said glow tube for alternately rendering said vacuum tubes operative to transform said direct current into an alternating current of a frequency determined by the frequency of operation of said glow tube.

6. In a current converter; a control circuit including a two-element glow tube, a source of current, a resistance, and a condenser; with means for varying said resistance to vary the charging frequency of said condenser and the consequent frequency of operation of said glow tube, and means including vacuum tubes controlled by current flow through said glow tube for converting current from a direct current source into an alternating current of a frequency determined by the value of said resistance.

OTHO D. GRANDSTAFF.